United States Patent
Caplan et al.

[11] Patent Number: 5,667,291
[45] Date of Patent: Sep. 16, 1997

[54] ILLUMINATION ASSEMBLY FOR DENTAL AND MEDICAL APPLICATIONS

[75] Inventors: Charles H. Caplan; Frederick N. Bushroe, both of Tucson, Ariz.

[73] Assignee: Surgical Acuity, Inc., Madison, Wis.

[21] Appl. No.: 447,357

[22] Filed: May 23, 1995

[51] Int. Cl.⁶ ............................................. F21L 15/14
[52] U.S. Cl. ........................... 362/105; 362/32; 362/804
[58] Field of Search ........................... 362/26, 32, 105, 362/106, 804

[56] References Cited

U.S. PATENT DOCUMENTS

| | | | |
|---|---|---|---|
| 2,226,941 | 12/1940 | Montalvo-Guenard . | |
| 3,285,242 | 11/1966 | Wallace | 362/105 X |
| 3,350,552 | 10/1967 | Lawrence | 362/105 |
| 3,828,201 | 8/1974 | Allen, Sr. | 307/150 |
| 3,951,139 | 4/1976 | Kloots | 128/23 |
| 4,104,709 | 8/1978 | Kloots | 362/105 |
| 4,234,910 | 11/1980 | Price | 362/105 |
| 4,797,736 | 1/1989 | Kloots et al. | 362/105 |
| 5,281,134 | 1/1994 | Schultz | 433/29 |
| 5,331,357 | 7/1994 | Cooley et al. | 351/158 |
| 5,337,735 | 8/1994 | Salerno | 128/11 |
| 5,341,513 | 8/1994 | Klein et al. | 2/9 |
| 5,348,470 | 9/1994 | McGowan et al. | 433/30 |
| 5,355,285 | 10/1994 | Hicks | 362/32 |
| 5,381,263 | 1/1995 | Nowak et al. | 359/411 |
| 5,384,881 | 1/1995 | Miller | 385/115 |
| 5,430,620 | 7/1995 | Li et al. | 362/32 |

*Primary Examiner*—Stephen F. Husar
*Attorney, Agent, or Firm*—DeWitt Ross & Stevens S.C.

[57] ABSTRACT

A small, lightweight, high intensity illumination assembly for use in dental and medical applications. The illumination assembly includes attachment means for removable attachment to headgear such as eyeglasses, face shields, or headbands, and lenses, loupes, and binoculars associated with such headgear. The illumination assembly is able to achieve extremely light weight by using only a single optical element therein, e.g., an aspheric condensing lens, binary optical element, or holographic optical means, and by piping illumination to the optical element from a remote light source by use of a flexible light guide, e.g., a fiberoptic bundle.

20 Claims, 8 Drawing Sheets

ILLUMINATION ASSEMBLY FOR DENTAL AND MEDICAL APPLICATIONS

FIELD OF THE INVENTION

The invention relates generally to the field of head-mounted illumination devices for medical and dental use, and specifically to the field of small, lightweight, high-intensity illumination assemblies for medical and dental use which are mounted on the user's head to provide coaxial illumination.

DESCRIPTION OF THE PRIOR ART

Personnel who work in medical and dental fields frequently have a need to illuminate a portion of a patient or workpiece as they operate on the patient or workpiece. At the same time, they require the free use of their hands. Both of these needs are met by illumination assemblies known to the art which are mounted on the user's head or headgear and which illuminate the patient or workpiece. An example of such an apparatus can be found in U.S. Pat. No. 5,341,513 to Klein et al., which describes a headband whereupon a lamp is mounted.

However, there are certain characteristics which are desirable in head-mounted illumination assemblies and which the devices of the prior art fail to either partially or entirely include.

First, the illumination beam supplied by the illumination assembly should correspond as closely as possible to the user's line of vision, i.e., the illumination assembly should illuminate the patient or workpiece from a point as close to the user's eyes as possible (preferably from immediately between the eyes). Otherwise, the user's hands, arms, or other objects may obstruct the light path and cast shadows upon the patient or workpiece and increase the difficulty in viewing the patient or workpiece. Also, dentists and medical personnel often have a need to look into very small holes, such as holes drilled into teeth, and the interior of such holes generally cannot be viewed without direct illumination along the axis of the hole. If the illumination source is mounted near the user's eyes and emits a beam of illumination which is parallel to and very nearly coaxial with the user's line of sight, the chances for the creation of shadows is minimized. Additionally, such a mounting position ensures that the user will automatically illuminate any area that the user views provided the user's head is directed toward that area.

Second, the illumination assembly should be safe and comfortable to wear. Some prior art devices include light sources mounted on a user's head or headgear, such as those of U.S. Pat. No. 3,350,552 to Lawrence and U.S. Pat. No. 5,341,513 to Klein et al, which respectively illustrate lamps mounted to eyeglasses and a headband. These devices have proven to be disadvantageous in that they can create a great deal of heat at a point close to the user's head, especially if high-intensity lightbulbs are used. These devices can therefore be intensely uncomfortable to wear because they cause hot air to rise into the user's face when the user looks down, they cause perspiration from the user's forehead to drip into the user's eyes (and onto the patient or workpiece), and they can even cause burns to the user or patient when they grow hot enough. Because the prior art illumination assemblies which mount a light source directly to the user's head are so uncomfortable, many devices instead use a light guide to transmit light from a remotely-located light source. Examples of such devices are illustrated in U.S. Pat. No. 3,285,242 to Wallace, U.S. Pat. No. 4,234,910 to Price, U.S. Pat. Nos. 3,951,139 and 4,104,709 to Kloots, U.S. Pat. No. 4,797,736 to Kloots et al, and U.S. Pat. No. 5,331,357 to Cooley et al.

Third, the illumination assembly should be capable of use on different parts of the user's head, and should also be capable of being adjustably positioned to illuminate different desired areas. Many of the prior art illumination assemblies are not very versatile because they are permanently mounted within already existing headgear, such as the illumination devices of Cooley et al. and Price, which show eyeglasses with illumination elements at opposing sides of the eyeglass frames adjacent the support legs. These devices can neither be used without the associated headgear nor repositioned to illuminate different areas of the patient or workpiece. Additionally, if an illumination assembly is permanently affixed to headgear such as eyeglasses, headbands, face shields, etc., it is often difficult to use a second type of headgear in conjunction with the first type of headgear and the illumination assembly. For example, a face shield can either scatter or entirely obstruct the light emitted from the devices of Price and Cooley et al.

Fourth, since the illumination assembly may become contaminated with particles from the patient or workpiece or fluids splashing therefrom, the illumination assembly should be easy to clean.

Fifth, the illumination assembly should produce an illuminated spot of high and uniform intensity. A small, bright spot is extremely important to most medical and dental applications, such as when the interior of a cavity must be viewed (e.g., the interior of a hole drilled within a tooth). In that case, full illumination of the cavity is desired with minimum illumination of the surrounding area outside the cavity. Ideally, the spot size should also be variable in order to allow the user to tailor the spot size to fit the area to be illuminated. U.S. Pat. No. 4,104,709 to Kloots describes an illumination device which provides a continuously variable spot size, as does U.S. Pat. No. 3,285,242 to Wallace.

Sixth, the weight of the illumination assembly should be small enough that the headgear does not dig into the user's head and so that the user is virtually unaware of its presence on the user's head. The prior art illumination assemblies tend to be quite heavy due to their use of several optical elements (lenses, prisms, mirrors, etc.) and means for mounting these optical elements within the illumination assembly. The several optical elements are required in order to produce a properly sized, well-defined, uniform spot, especially in the illumination assemblies which allow for a variable spot size (e.g., the aforementioned patent to Wallace and U.S. Pat. No. 4,104,709 to Kloots). Because the optical elements must generally be made of heavy, high-grade refractive glass to decrease their size and increase their optical quality, the optical elements comprise a substantial percentage of the illumination assembly's overall weight. Due to the weight of the glass, the addition of even a single additional optical element tends to dramatically increase the weight of an illumination assembly. Additionally, while the art is beginning to develop plastic lenses of high optical quality and lighter weight than glass lenses, these lenses are not preferred for use at exposed portions of the illumination assembly because they are more easily scratched, scuffed, or otherwise damaged during cleaning.

The weight of the illumination assembly can also create greater problems than discomfort. It can make a substantial difference in its operability and safety of use, since a heavy illumination assembly can cause headgear to shift or even fall off the head. For example, if the prior art illumination assemblies were attached to lenses, loupes, or telescopic binoculars used in association with eyeglasses, such as "ORASCOPTIC DIMENSION-3" telescopic binoculars (Orascoptic Research, Inc. of Madison, Wis.), they would cause the binoculars to relocate downward rather than staying focused at the height the user desires. This can be disastrous where the user's hands are performing an important medical procedure since the user may be forced to interrupt the procedure to readjust the binoculars, or else simply proceed and perform the procedure with impaired vision. As another example, when the prior art illumination assemblies are mounted to eyeglasses, they tend to pull the eyeglasses off of the user's head if he or she looks downward. Obviously, the user would prefer not to have the illumination assembly and its associated headgear fall upon or within the operating area on the patient or workpiece.

Seventh, the illumination assembly should be as small as possible to increase its ease of use and to prevent interference with the user's binocular or peripheral vision. Many of the prior art illumination assemblies have a large and awkward size, either due to their incorporation of internal illumination sources directly within the assembly or due to the requirements of the optics within the assembly. This is especially true of the aforementioned illumination assemblies which provide variable spot size. Also, large illumination assemblies interfere with the user's binocular vision when mounted coaxially between the user's eyes.

The prior art illumination assemblies are also difficult to use when mounted coaxially, or when mounted to headgear in general, due to their use of bulky and heavy electrical or light guide cords. These cords can bind and inhibit repositioning of illumination assemblies due to the stiffness of the cords, and they can also interfere with the user's binocular or peripheral vision. Thick and heavy cords are also uncomfortable to wear when draped over or about the user's head, and they contribute to a feeling that the user is bound or "leashed" to the power supply or remote illumination source. While the prior art illustrates smaller, lighter cords for supplying power or illumination to illumination assemblies, the smaller and lighter cords have the drawback that they cannot bear as much power or illumination to the illumination assemblies. Thus, if the user wishes to obtain the advantages of a smaller cord, he or she is generally forced to settle for less illumination.

In summary, the prior art does not include an illumination assembly which provides a sufficiently small and intense variable spot size while at the same time providing a versatile illumination assembly which is small and lightweight enough that it can be attached to various forms of headgear. In particular, the prior art does not include an illumination assembly as described above suitable for attachment to and use with eyeglasses, headbands, or face shields in accompaniment with lenses, loupes, or binoculars associated with the eyeglasses, headbands, or face shields.

SUMMARY OF THE INVENTION

The illumination assembly of the present invention overcomes the disadvantages of the prior art by providing an illumination assembly comprising a light guide having an output end and an input end, the input end being adapted for connection to a remote illumination source, a housing having a light guide opening and an illumination opening, the output end of the light guide extending within the housing and being aligned to illuminate the illumination opening, a single optical element within the housing, the optical element being mounted within the illumination opening, and attachment means for removably attaching the housing to headgear.

Additionally, the illumination assembly of the present invention overcomes the disadvantages of the prior art by providing an illumination assembly comprising a light guide having an output end and an input end, the input end being adapted for connection to a remote illumination source, a housing having a light guide opening and an illumination opening, the output end of the light guide extending within the housing and being aligned to illuminate the illumination opening, a positive lens mounted in the illumination opening, the positive lens having a curved face adjacent the output end and an opposing generally planar face, and attachment means for removably attaching the housing to headgear.

Further, the illumination assembly of the present invention overcomes the disadvantages of the prior art by providing an illumination assembly comprising a housing having an interior surface bounded by a light guide opening and an illumination opening, a housing base telescopically and rotatably engaged to the interior surface of the housing, the housing base being adapted to support a light guide to illuminate the illumination opening, a positive lens mounted in the illumination opening, the positive lens including an aspheric face adjacent the housing base and an opposing generally planar face, and attachment means, pivotably attached to the housing base, for removably attaching the housing base to headgear.

The illumination assembly uses a remote illumination source and transmits the illumination to the illumination assembly by use of a lightweight flexible light guide, such as a fiberoptic bundle, and therefore avoids heating the user's head or excessively weighting the user's head. The housing of the illumination assembly may be adjusted to alter the distance between the light guide and the optical element and thereby provide a variable size illuminated spot of high and uniform intensity.

The illumination assembly utilizes a single optical element in place of the multiple optical elements found in the prior art. The optical element for use within the illumination assembly is contemplated to be an positive focal length refractive lens, more particularly an aspheric condensing lens having a planar face and an aspheric face wherein the aspheric face is directed toward the light guide. This lens has been found to work admirably well in place of multiple optical elements.

Versatile attachment means for removably attaching the illumination assembly to the user's headgear (e.g., face shields, headbands, and eyeglasses, and associated lenses, loupes, and binoculars) allow the illumination assembly to be quickly fit to a wide variety of different types of headgear. The attachment means allows mounting of the illumination assembly in a position between the eyes of the user to provide coaxial in-line shadowless illumination of the operating site, and to automatically illuminate the area the user is viewing.

The illumination assembly is small, having a maximum dimension of approximately 1.8 inches without the attachment means and light guide, or approximately 1.6 inches when the housing is telescopically reduced to minimum length. By using only a single glass optical element within the housing and by remotely locating the illumination source, the weight of the illumination assembly is substantially reduced when compared to the illumination assemblies of the prior art. The weight is further reduced because there is no need for the heavy ceramic potting or reflective means that are required when the illumination source is located within the illumination assembly, and because a light guide having a small diameter is used. The weight of the illumination assembly without the attachment means and light guide is only approximately 8–10 grams when a plastic housing is used.

Due to its low weight, the illumination assembly is ideal for use with headgear such as face shields, headbands, and eyeglasses, and associated devices such as lenses, loupes, and binoculars, since it will not cause the headgear or associated devices to shift or fall from the user's head. Additionally, the illumination assembly is small enough in both diameter and length that it does not interfere with the user's binocular vision when mounted coaxially; it is virtually invisible to the user when mounted between the eyes. The light guide is small enough that it is unseen and virtually unfelt by the user, and its weight and stiffness will not cause the illumination assembly to inadvertently readjust or reposition against the user's wishes. Despite the small size of the light guide, its use does not decrease the illumination of the illumination assembly due to the high efficiency of the remainder of the assembly.

Further advantages, features, and objects of the invention will be apparent from the following detailed description of the invention in conjunction with the associated drawings.

DETAILED DESCRIPTION OF THE INVENTION

Figure 1:
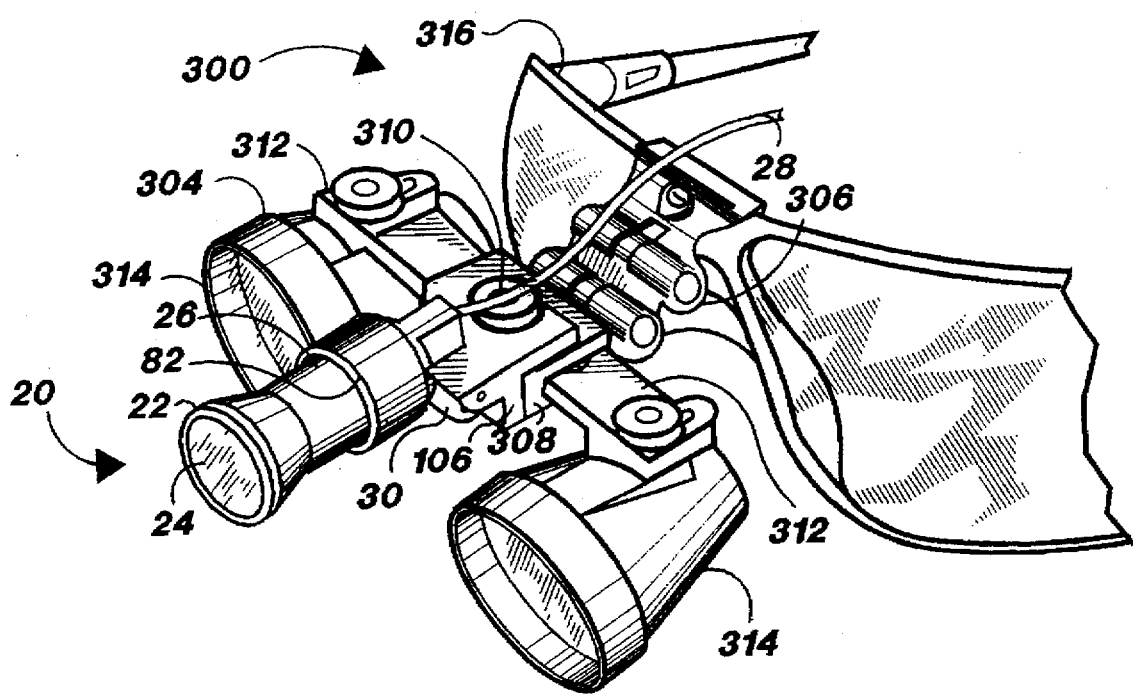
FIG. 1 is a perspective view of the illumination assembly of the present invention shown mounted on a pair of telescopic binoculars affixed to a pair of eyeglasses.
Figure 2:
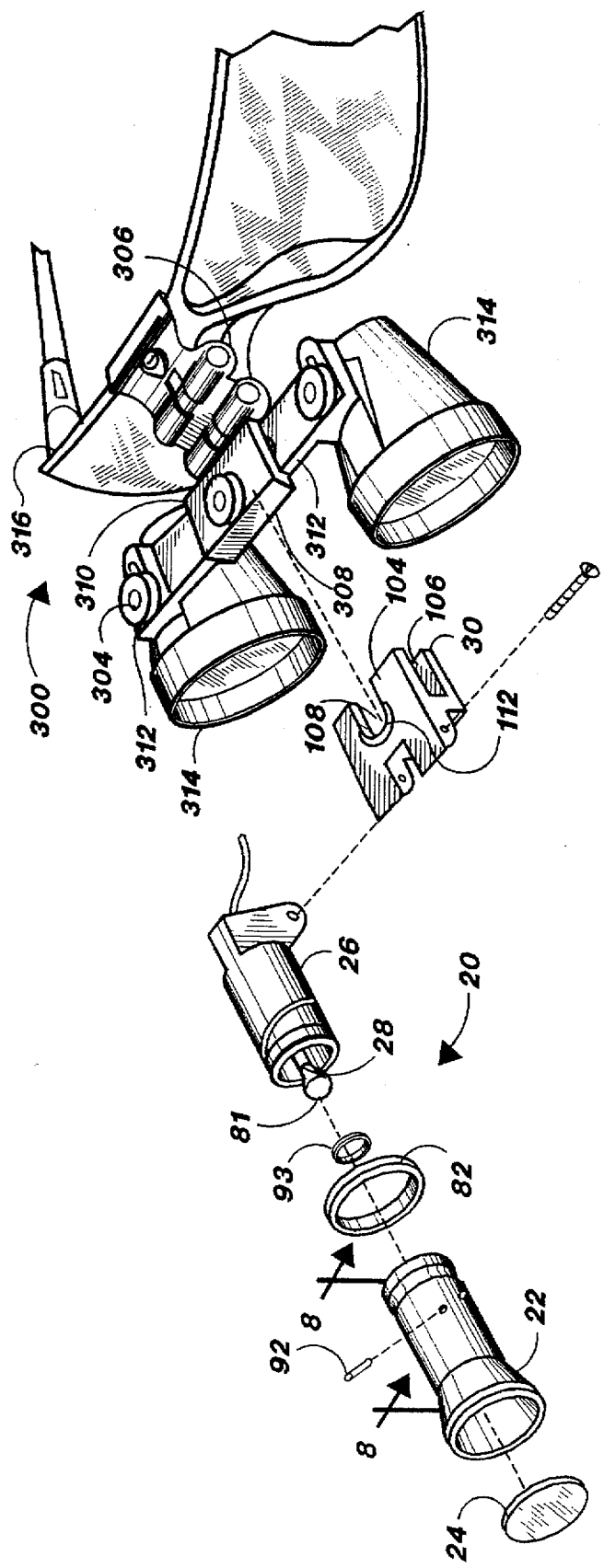
FIG. 2 is an exploded perspective view of the illumination assembly of FIG. 1.
Figure 3:
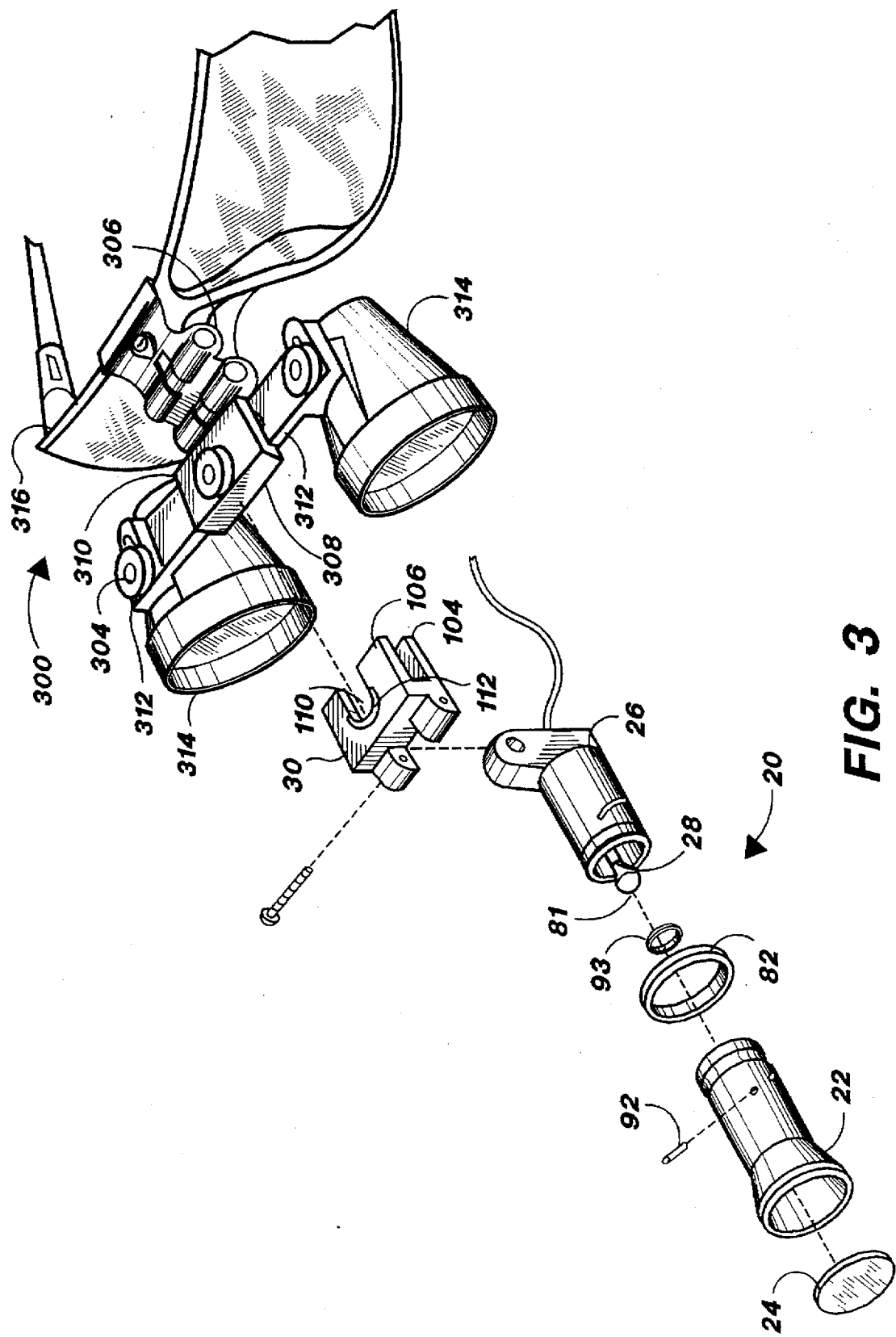
FIG. 3 is an exploded perspective view of the illumination assembly of FIG. 1 situated in an alternate position.

In the drawings, wherein the same or similar features are designated throughout with the same reference numeral, the illumination assembly of the present invention is shown at 20 in FIGS. 1–3. The illumination assembly 20 has five main components: a housing 22 which contains an optical element 24, a housing base 26 engaged to the housing 22 and wherein a light guide 28 enters, and a clip 30 which provides attachment means for removably attaching the housing base 26 to the user's head or headgear. Throughout this specification, when reference is made to attachment of the illumination assembly 20 to the user's head or headgear, this is understood to include attachment to implements mounted on the user's head such as eyeglasses and goggles, face shields and masks, and headbands and helmets, as well as similar implements. It is further understood to include attachment to accessory implements such as lenses, loupes, and binoculars mounted on the aforementioned implements. Each of the components of the illumination assembly 20 will be discussed in turn.

Figure 5:
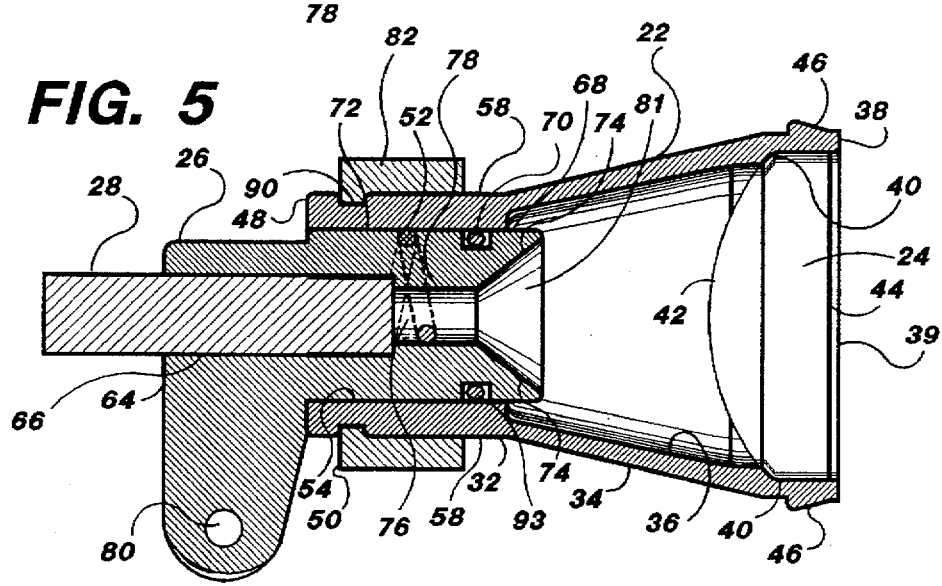
FIG. 5 is a side elevated view of the illumination assembly shown without the attachment means.
Figure 6:
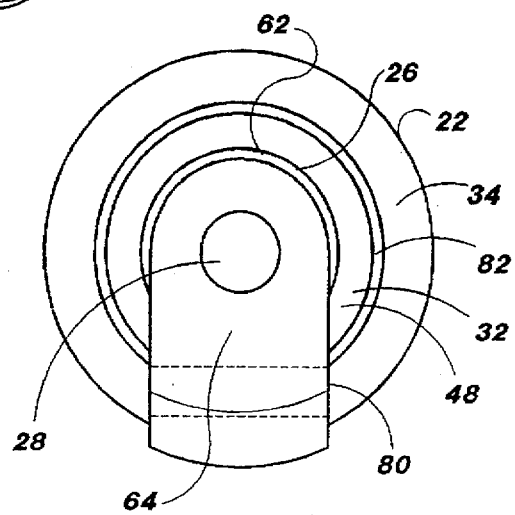
FIG. 6 is a rear elevated view of the illumination assembly shown without the attachment means.
Figure 7:
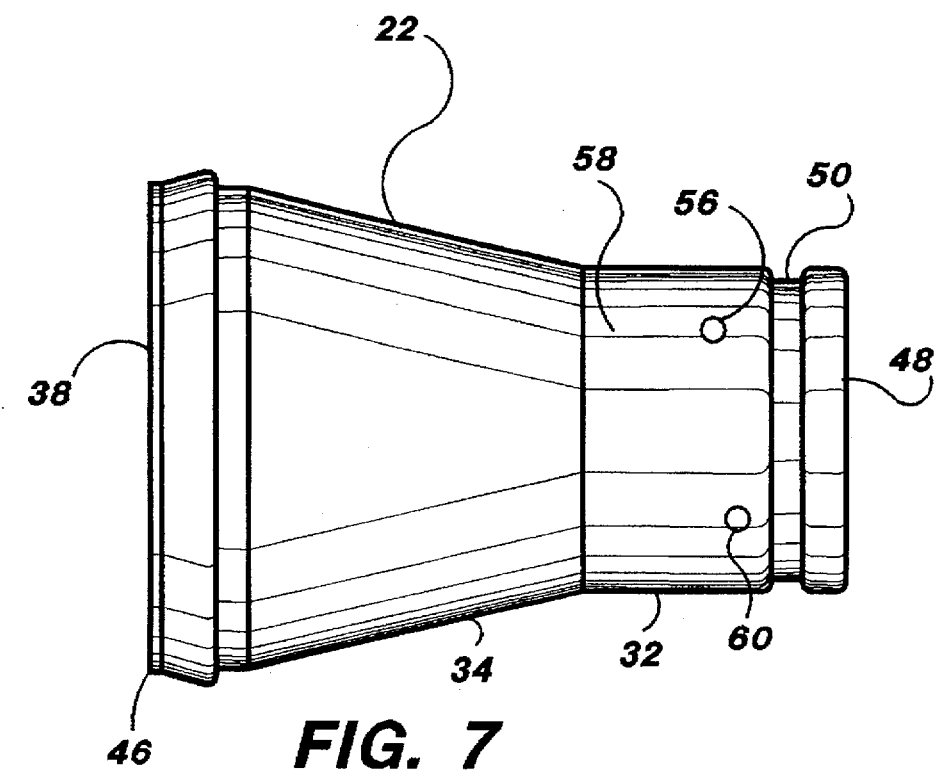
FIG. 7 is a side elevated view of the housing of the illumination assembly.
Figure 8:
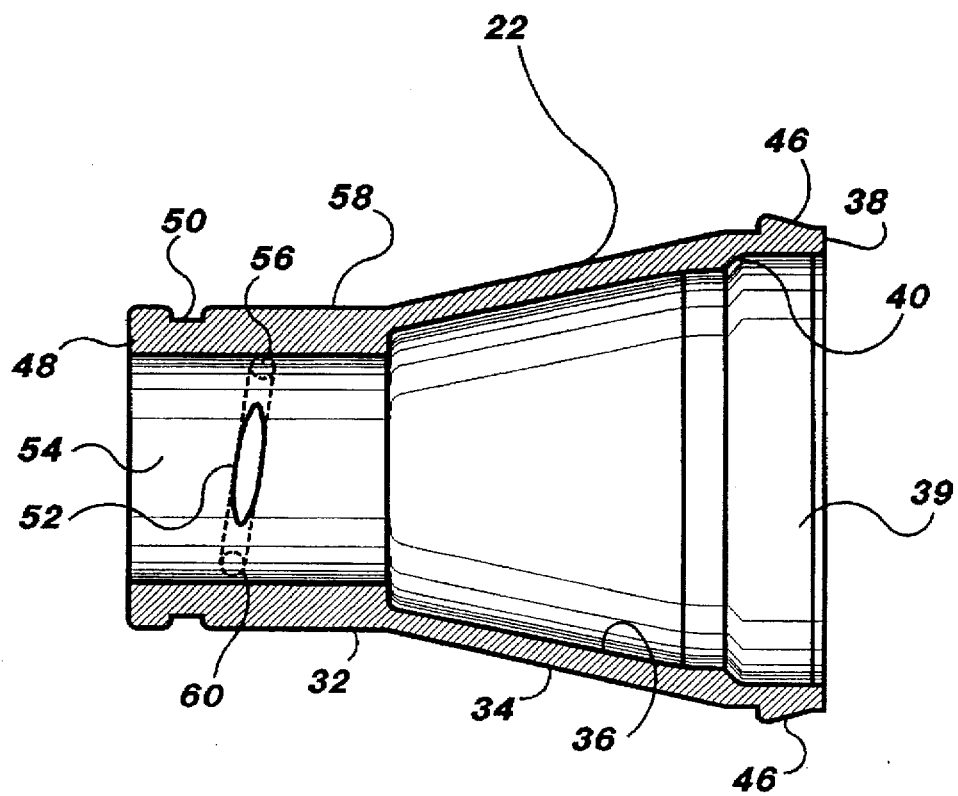
FIG. 8 is a side cross-sectional view of the housing of the illumination assembly taken along line 8—8 of FIG. 3.

FIGS. 4–8, and particularly FIGS. 7–8, best illustrate the housing 22. The housing 22 has a rear cylindrical portion 32 and a forward frustoconical portion 34. The forward frustoconical portion 34 includes an interior surface 36 having a rim 38 which defines an illumination opening 39. An interior bevel 40 is included on the interior surface 36 near the rim 38 so that the optical element 24 may be received therein and affixed in snap-fit relation, by staking or adhesives, or by other affixment means known to the art. The forward frustoconical portion 34 additionally includes an exterior attachment bevel 46 whereupon filters may be attached in snap-fit fashion if desired. Other modes of filter attachment, such as threaded attachment, may be used by configuring the exterior attachment bevel 46 accordingly.

The rear cylindrical portion 32 of the housing 22 has a rear end 48, a circumferential engagement slot 50 located near the rear end 48, and a pin slot 52 on its interior surface 54. The purposes of these features will be described shortly. The pin slot 52 is preferably formed by drilling an entry hole 56 on the exterior surface 58 of the rear cylindrical portion 32 and extending the drill until it emerges on the interior surface 54, and further extending the drill so it exits through an exit hole 60 back to the exterior surface 58.

In the preferred embodiment of the illumination assembly 20, the maximum diameter of the forward frustoconical portion 34 is approximately 0.78 inches and the diameter of the rear cylindrical portion 32 is approximately 0.47 inches. This small diameter is especially helpful in avoiding interference with the user's binocular vision. The distance between the rear cylindrical portion 32 and the interior bevel 40 is approximately 0.47 inches. The housing 22 has an overall length of approximately 1.26 inches. The housing 22 is made of "VALOX" or "NORYL" (General Electric, Inc., New York, N.Y.), though other plastic, metal, or ceramic substances could be used.

Figure 4:
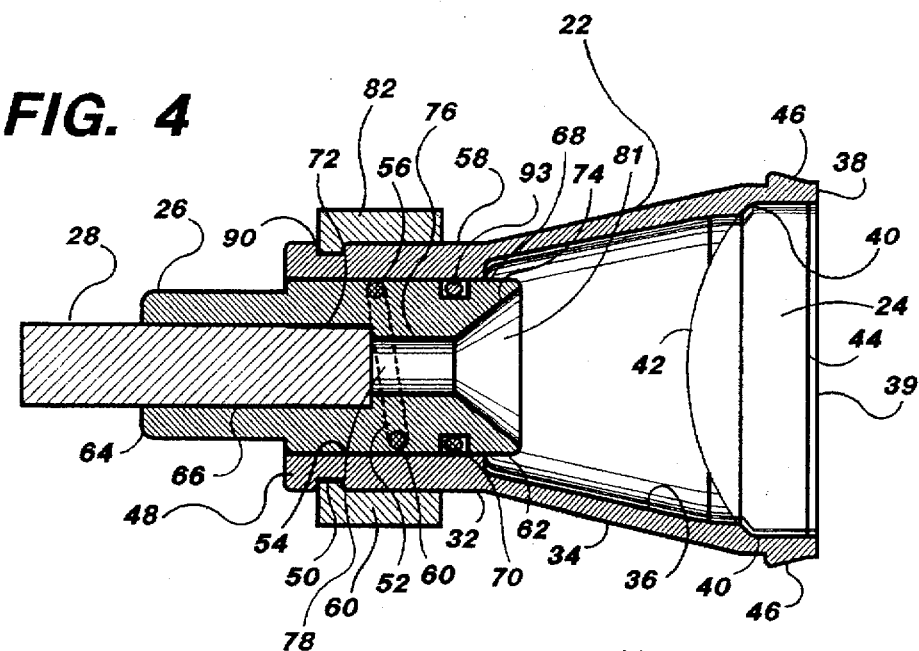
FIG. 4 is a top plan view of the illumination assembly shown without the attachment means.

The optical element 24, which is shown best in FIGS. 4 and 5, is preferably a refractive lens having a positive focal length, i.e., a positive lens. Such a lens collects illumination from within the housing 22 and projects it to an area in front of the housing 22. While a plano-convex lens could be used for the optical element 24, superior results (i.e., better spot size and intensity with a smaller and lighter lens) have been found to occur with the use of an aspherical lens having a curved surface 42 and an opposing planar surface 44. The preferred optical element 24 is the No. 17.1025 aspheric condensing lens manufactured by Rolyn Optics Company of Covina, Calif., which has an 18 mm diameter, a center thickness of 7.4 mm, an edge thickness of 3.3 mm, a focal length of 15 mm, a back focal length of 10.1 mm, and is made of B-270 glass.

The optical element 24 is mounted within the interior bevel 40 with its curved surface 42 adjacent the interior surface 36 of the forward frustoconical portion 34 of the housing 22, and with the planar surface 44 facing outward to provide a flat surface for cleaning purposes. Some prior art illumination assemblies have the disadvantage that they use an exposed curved lens surface, and matter can splash from the operating surface onto the lens surface and collect either on the face of the lens or in the corners where the lens is joined to the housing. The matter would then dry and firmly adhere to the lens surface, especially in those illumination assemblies wherein the lens surface was subject to heating from the illumination source. The matter would become extremely difficult to clean off without scrubbing, and scrubbing sometimes causes scratches in the lens and gradual degradation of the illumination quality. The exposed planar surface 44 does not provide a concave lens surface wherein matter can adhere, nor does it provide the tight corner between the optical element 24 and the housing 22 that a convex lens surface provides.

Figure 9:
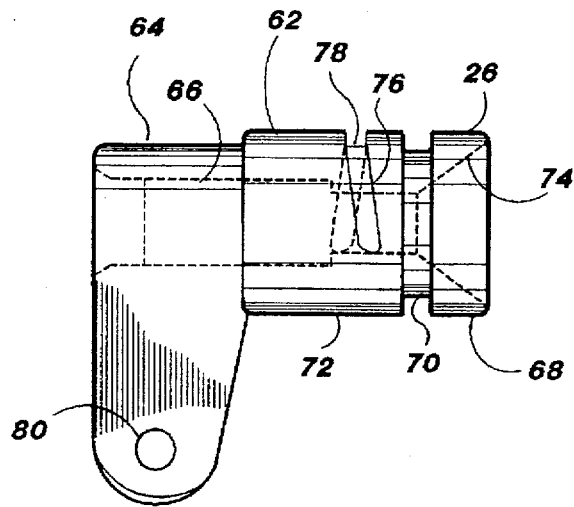
FIG. 9 is a side elevated view of the housing base of the illumination assembly.
Figure 10:
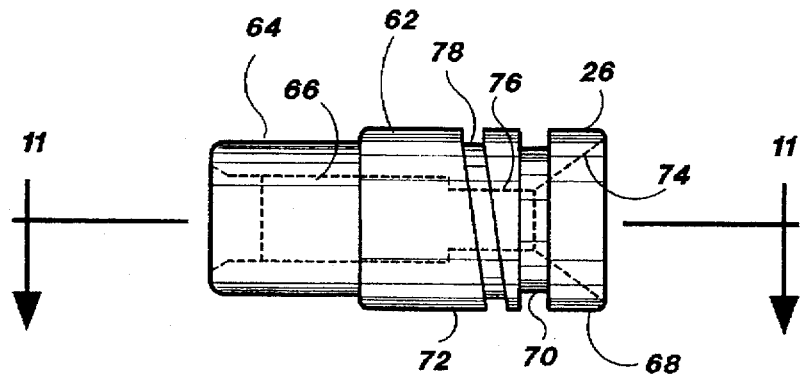
FIG. 10 is a top plan view of the housing base of the illumination assembly.
Figure 11:
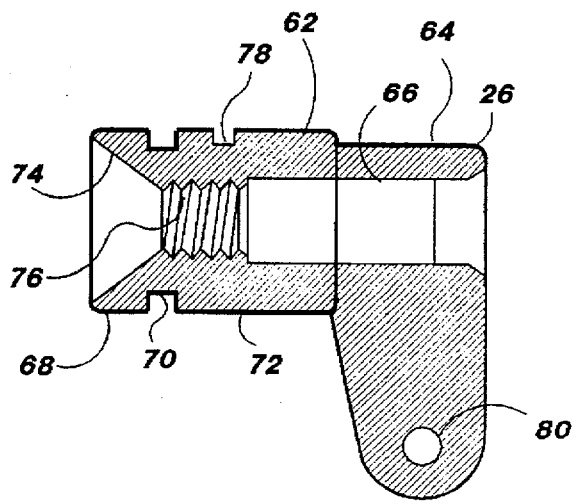
FIG. 11 is a side cross-sectional view of the housing base of the illumination assembly taken along lines 11—11 of FIG. 10.
Figures 12, 13:
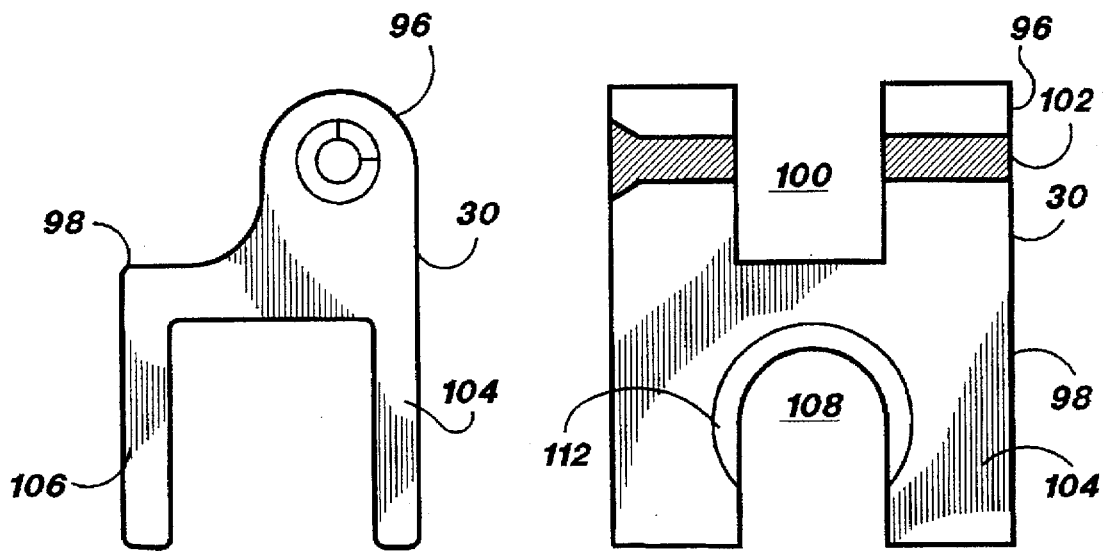
FIG. 12 is a side elevated view of the preferred attachment means of the illumination assembly.
FIG. 13 is a top plan view of the preferred attachment means of the illumination assembly.
Figure 14:
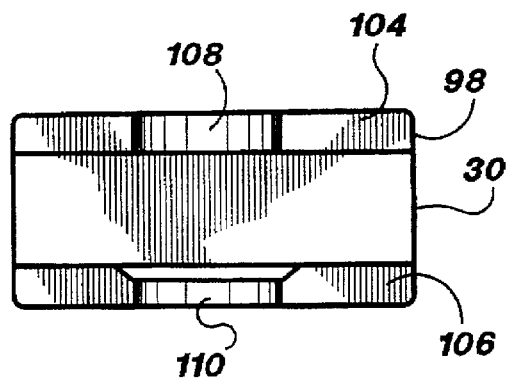
FIG. 14 is a rear elevated view of the preferred attachment means of the illumination assembly.
Figure 15:
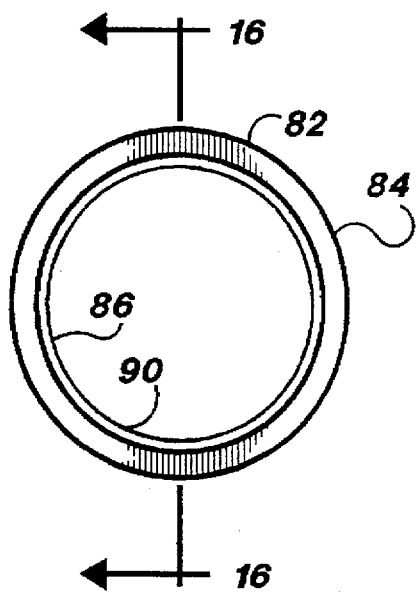
FIG. 15 is a front elevated view of the retainer ring of the illumination assembly.
Figure 16:
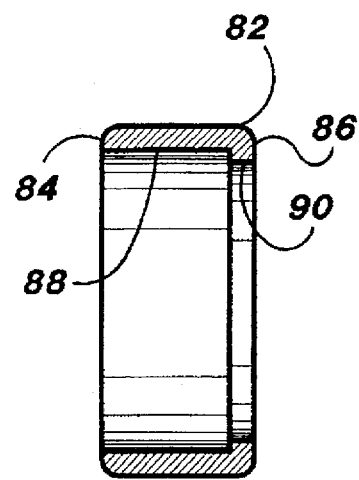
FIG. 16 is a side cross-sectional view of the retainer ring of the illumination assembly taken along line 16—16 of FIG. 15.
Figure 17:
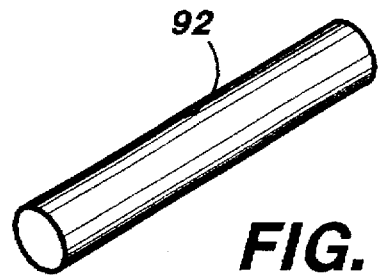
FIG. 17 is a perspective view of the pin of the illumination assembly.

The housing base 26 is illustrated in detail in FIGS. 9–11. The housing base 26 has two main portions, a plug portion 62 and a clip portion 64, with a light guide channel 66 running through both portions. The plug portion 62 includes a head 68, a neck 70, and a body 72, and is adapted to fit closely within the rear cylindrical portion 32 of the housing 22. As best shown by FIG. 11, the light guide channel 66 includes a light guide opening 73 in the body 72 wherein the light guide 28 enters, and tapered and threaded portions 74 and 76 near the head 68 adapted to receive a threaded end terminator on the light guide 28. The body 72 contains a helical groove 78, the purpose of which will be explained shortly.

The clip portion 64 of the housing base 26 is adapted to be fastened to attachment means so that the housing base 26 and the associated housing 22 may be affixed to the user's headgear. Thus, the clip portion 64 is substantially flattened and includes a pin aperture 80, and is therefore ideally suited for insertion within and attachment to a clevis, as will be discussed below.

In the preferred embodiment of the illumination assembly 20, the housing base 26 has an overall length of approximately 1 inch, of which the clip portion 64 occupies approximately 0.34 inches. The housing base 26 is made of "VALOX" or "NORYL", though other plastic, metal, or ceramic substances could be used.

The light guide 28 has an input end (not shown) for connection to a remote light source, and also an output end 81 which bears a threaded end terminator known to the art, e.g., a 6–32 screw thread end terminator. The light guide 28 may be any type of light guide known to the art, such as singular or bundled plastic or glass fiberoptic cables or liquid-filled light guides. The preferred embodiment of the illumination assembly 20 utilizes a bundle of several glass fiberoptic cables with a total optical transmission diameter of 2 mm and a numerical aperture greater than or equal to 0.5. Exemplary fiberoptic cable is manufactured by Dolan-Jenner Industries, Inc. of Lawrence, Mass., and also by Fiberoptic Systems, Inc. of Simi Valley, Calif. Exemplary liquid-filled light guides are made by Electro-Lite Corp. of Danbury, Conn. and Oriel Corp. of Stratford, Conn. Regardless of how many fibers are chosen for the fiberoptic bundle or what the optical transmission diameter of the light guide 28 is to be, the use of multiple fibers is recommended because it reduces the potential for breakage of the light guide 28 as compared to the prior art single-fiber illumination assemblies. A 2 mm or smaller light guide is preferred because larger light guides are heavy, clumsy, and difficult to affix to certain headgear (e.g., to glasses) and to drape about the user's head, and they further tend to be so heavy and stiff that they interfere with fine positioning of the illumination assembly 20 or cause the illumination assembly 20 to inadvertently reposition during use.

The illumination assembly 20 is shown in assembled form in FIGS. 4–6 without the attachment means. Apart from the housing 22, optical element 24, housing base 26, and light guide 28, three additional components are recommended for inclusion within this portion of the illumination assembly 20. The first component is a retainer ring 82. The retainer ring 82 is a frustoconical ring having a front rim 84, a rear rim 86, and an interior surface 88. The retainer ring 82 includes a lip 90 protruding radially inward from the interior surface 88 at the front rim 86. The retainer ring 82 is preferably made of a flexible resilient material which can be slightly deformed without breaking, and which will generally tend to revert to its original shape after deformation. In the preferred embodiment of the invention, the retainer ring 82 is made out of "VALOX" or "NORYL". The second component is a pin 92, which is a small rod-like member which is preferably made of metal, such as stainless steel. The third component is an O-ring 93 made of silicone rubber or a similar flexible high-friction substance, and which is adapted to fit within the neck 70 of the housing base 26.

To assemble the portion of the illumination assembly 20 illustrated in FIGS. 4–6, the optical element 24 is inserted within the interior bevel 40 and affixed therein by staking the rim 38 (as shown in FIGS. 4 and 5 by means of heat, ultrasound, or other means. Alternatively, the optical element 24 may simply be glued into the interior bevel 40 my use of adhesives known to the art. The light guide 28 is inserted within the light guide channel 66 of the housing base 26, and its end terminator is attached to the head 68 of the housing base 26 within the light guide channel 66. As noted earlier and as shown in FIGS. 4–5 and 9–11, the tapered portion 74 and threaded portion 76 of the light guide channel 66 are adapted to receive a threaded end terminator. The O-ring 93 is slipped over the plug portion 62 of the housing base 26 until it rests within the neck 70. The retainer ring 82 is slipped over the plug portion 62 of the housing base 26 with the rear rim 86 first. The housing 22 is then slipped over the plug portion 62 of the housing base 26 so that the plug portion 62 rests within the rear cylindrical portion 32 of the housing 22. The helical groove 78 in the plug portion 62 of the housing base 26 is aligned with the pin slot 52 on the interior surface 54 of the rear cylindrical portion 32. The pin 92 is inserted within the entry hole 56 to engage both the pin slot 52 and helical groove 78. When the pin 92 is fully inserted within the pin slot 52, it extends from the entry hole 56 to the exit hole 60 without protruding from the exterior surface 58 of the rear cylindrical portion 32. The retainer ring 82 is then slid forward on the rear cylindrical portion 32 of the housing 22 until the lip 90 engages the engagement slot 50. When this is done, the interior surface 88 of the retainer ring 82 holds the pin 92 within the pin slot 52 and prevents it from falling out of the entry or exit holes 56 and 60.

When the housing 22, housing base 26, retainer ring 82 and pin 92 are assembled in the arrangement described above and as shown in FIGS. 4–6, the housing 22 may be rotationally telescoped in relation to the housing base 26 due to the action of the pin 92 within the helical groove 78. As can be seen in FIGS. 4 and 5, this telescopic adjustment alters the distance between the optical element 24 and the terminal end of the light guide 28, and therefore provides for adjustment of the spot size. The O-ring 93 provides frictional means for preventing unwanted telescopic rotation of the housing 22, and it also prevents moisture from entering the housing 22.

Attachment means for removably attaching the illumination assembly 20 to headgear may then be mounted to the clip portion 64 of the housing base 26 to form the completed illumination assembly 20.

FIGS. 1–3 and 12–14 illustrate the preferred attachment means, a clip 30. The clip 30 is divided into a clip clevis 96 and a clip leg portion 98. The clip clevis 96 includes a clevis slot 100 adapted to receive the clip portion 64 of the housing base 26 therein. The clip clevis 96 further includes a pivot aperture 102 wherein a fastener may be inserted to pivotally affix the clip clevis 96 to the clip portion 64. The clip leg portion 98 includes a first leg 104 and a second leg 106 which are spaced to accommodate some part of headgear therebetween to retain the clip 30 on the headgear. In the clip 30, each of the legs 104 and 106 is furcated by the inclusion of respective peg slots 108 and 110, the purpose of which will be described below. The clip 30 may be made of suitable metal, plastic or ceramic materials, and the preferred embodiment of the clip 30 is made of "VALOX" or "NORYL".

The construction of illumination assembly 20 is completed by inserting the plug portion 62 of the housing base 26 within the clevis slot 100 of the clip 30. A fastener (preferably a screw) is inserted through the pivot aperture 102 to pivotably affix the two parts together. When fully assembled, the housing 22 and optical element 24 can move in two degrees of freedom: they can rotate upward and downward about the clip clevis 96, and they can move forward and backward by rotationally telescoping the housing 22 about the plug portion 62 of the housing base 26.

FIGS. 1–3 illustrate the use of the clip 30 to mount the illumination assembly 20 to a binocular telescope and eyeglass system 300 known to the art, a brief description of which is now provided. The binocular telescope and eyeglass system 300 includes eyeglasses 302 and binocular telescope 304. An exemplary binocular telescope 304 is the "ORASCOPTIC DIMENSION-3" binocular telescope (Orascoptic Research, Inc., Madison, Wis.), and the description set forth herein will be made with reference to that binocular telescope, though it is understood that the illumination assembly 20 is not limited to either this binocular telescope or even this type of headgear in general. The binocular telescope 304 is attached to the eyeglasses 302 by use of a pivot member 306. The pivot member 306 is attached to a bridge 308 which an includes a bridge adjustment knob 310 for adjusting the extension of arms 312 and thus the interpupillary distance of loupes 314.

As shown in FIGS. 1 and 2, the first leg 104 and second leg 106 of the clip 30 may be slipped over the bridge 308 with the peg slot 108 accommodating the bridge adjustment knob 310 therein. Alternatively, as shown in FIG. 3, the illumination assembly 20 may be inverted so that the peg slot 110 accommodates the bridge adjustment knob 310 therein and the housing 22 rests between the loupes 314 to provide direct on-line coaxial illumination. Preferably, the area on the first leg 104 immediately adjacent the peg slot 108 and the area of the second leg 106 immediately adjacent the peg slot 110 each bear a beveled surface 112 to assist in easy insertion of the bridge adjustment knob 310 within either peg slot 108 or 110. The light guide 28 may be directed up to the nosebridge of the eyeglasses 302 and directed about the user's head as desired, for example, by taping or clipping the light guide 28 to a rim 316 of the eyeglasses 302. Unlike the illumination devices of the prior art, the illumination assembly 20 is light and small enough that it will not cause the binocular telescopes 300 to tip downward about the pivot member 306, nor will it interfere with the use's binocular vision when coaxially mounted. Additionally, the use of the 2 mm fiberoptic bundle for the light guide 28 provides exceptionally high illumination intensity, but it still allows for easy mounting of the illumination assembly 20 onto binocular telescopes 300 or similar headgear without interfering with the user's vision, comfort, or ease of using the illumination assembly 20.

Figure 18:
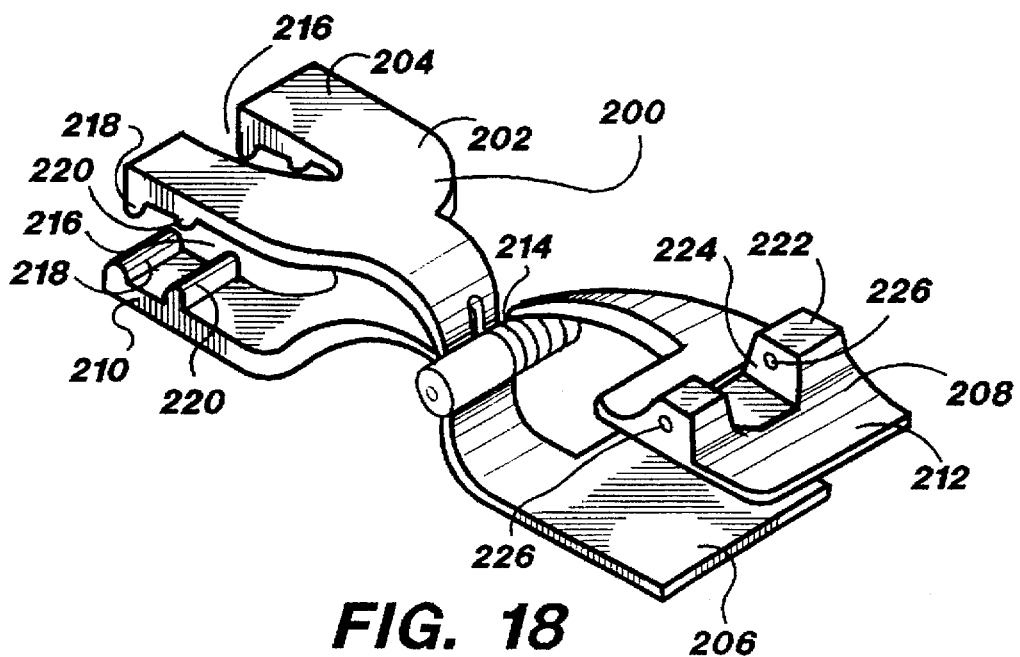
FIG. 18 is a perspective view of an alternative attachment means for the illumination assembly.

The attachment means described above may be replaced by any type of clip, buckle, latch, bracket, hook, loop, fastener, carriage, or similar attachment structure or means known to the art, also including adhesive and magnetic means. An example of an alternative embodiment of the attachment means is illustrated by a clip 200 illustrated in FIG. 18. The clip has a first member 202 having a jaw 204 and a handle 206, and a second member 208 with a jaw 210 and a handle 212. The jaws 204 and 210 are biased into a normally closed position by a spring 214. The jaws 204 and 210 are furcated so that they each include a peg slot 216 for receiving the bridge adjustment knob 310 therein. Additionally, the jaws 204 and 210 each include a pair of spaced ridges, a forward ridge 218 and a rear ridge 220. The second member 208 includes a clip clevis 222 which defines a clevis slot 224 wherein the clip portion 64 of the housing base 26 may rest. The clip clevis 222 further includes a pivot aperture 226 wherein a fastener may be inserted to affix the clip portion 64 to the clip clevis 222.

By pressing together the handles 206 and 212, the jaws 204 and 210 open so that the jaws may encompass and grasp either the bridge 300 of binocular telescope 302 or the nose bridge 310 of eyeglasses 304, in which case the nose bridge 310 may rest between the forward ridges 218 and the rear ridges 220. Alternatively, the clip 200 could be attached to other parts of the binocular telescope 302 or eyeglasses 304 instead, such as to the arms 312 of the binocular telescope 302 of the rim 316 of the eyeglasses 304. Because the clip 200 has spring-biased jaws 204 and 210 which may be adapted to grasp virtually any object, the clip 200 may be affixed not only to the binocular telescope 304 or eyeglasses 302, but also to headbands, face shields, or similar headgear. It is understood that a particular type of attachment means may be rapidly removed from the clip portion 64 of the housing base 26 and replaced with attachment means with different sizes and strengths suitable for attachment to different types of headgear.

The illumination assembly 20 is provided with illumination from a remote light source known to the art (not shown). An example of such a remote light source is shown in U.S. Pat. No. 4,234,910 to Price. The light source used in the preferred embodiment of the illumination assembly 20 is the "FIBER-LITE" model 180 light source manufactured by Dolan-Jenner Industries, Inc. of Lawrence, Mass., with a 150 watt EJA lamp used within. Other suitable light sources are the "FIBER-LITE" model 170-D by Dolan-Jenner Industries, Inc. or the model I-150 fiberoptic illumination light source made by Cuda Products Co. of Jacksonville, Fla. The light source preferably has a "breakaway" safety release at the attachment terminal where the light guide 28 is attached to the light source so that if the light guide 28 is given a sudden jerk, the terminal will release the light guide 28 rather than causing it to break. The remote light source also preferably has such features as a rheostat or similar device for selectively adjusting the illumination intensity to maximize bulb life, 110 and 220 volt operation capability, and a quiet cooling fan mechanism.

Because the light source is located remotely from the illumination assembly 20 and the illumination is piped in via the light guide 28, negligible heat is transferred to the user and/or patient or workpiece. If the illumination assembly 20 should transmit an undesired amount of infrared or ultraviolet radiation to the illumination assembly 20, the user may attach a filter to the exterior attachment bevel 46 of the housing 22 to filter out these radiation components. This step is helpful where light-cured materials are being worked with at the patient or workpiece, such as the light-cured composites used in dentistry. Alternatively (or additionally), the user could introduce a filter or dichroic mirror within the remote light source so that only the desired radiation components of illumination enter the light guide 28. This is helpful where plastic fiber(s) is used in the light guide 28 since plastic fiber can generally withstand less heat.

The preferred embodiment of the illumination assembly 20 as described above has a spot 1¾ inches in diameter with an intensity of approximately 30,000 lux, and the housing 22 may be telescoped to provide a spot of 2¾ inches diameter and approximately 24,000 lux. Both of these readings are obtained where the optical element 24 is located approximately 12 inches from the illuminated object. Since the illumination assembly 20 is actually located between 3-4 inches from the user's eyes when it is affixed to telescope binoculars 304 as shown in FIGS. 1-3, the user actually achieves a spot size of 1¾-2¾ inches in diameter when the user's head is positioned approximately 15-16 inches from the patient or workpiece. This spot size is well-suited for medical use and ideal for dentistry, as it provides full illumination of an oral cavity. There is negligible scattered light or stray light outside of the illuminated spot, and the illumination within the spot is only slightly center-weighted with minimal blurring at the spot edges. The spot is automatically directed to wherever the user is looking, so the user does not need to adjust an overhead light while operating.

Due to its small size, the illumination assembly 20 does not strike or interfere with the user's forehead when the binocular telescopes 302 are flipped about the telescope pivot 308 into a position parallel to the user's forehead. Since the illumination assembly 20 weighs only 8-10 grams versus 35-40 grams for similar illumination assemblies on the market, the user is for all practical purposes unable to notice the presence of the illumination assembly 20 on the user's head on account of its weight.

Owing to the small size and light weight of the illumination assembly 20 and its use of the clip 30, the illumination assembly 20 is far more versatile than the prior art illumination assemblies. It can easily be removed and reattached to different parts of headgear if the user finds it desirable to do so. For example, if the user wishes to wear a transparent face shield or safety goggles over a pair of eyeglasses, the illumination assembly 20 can be detached from the eyeglasses and remounted on the face shield or safety goggles.

It is understood that the illumination assembly 20 is not limited to the particular arrangement of parts and/or construction described above, but embraces such modified forms thereof that come within the scope of the following claims. For example, it is understood that a unitary housing could be used in place of the housing 22 and the housing base 26. It is also understood that different telescoping or telescopically rotating fastening arrangements between the housing 22 and the housing base 26 which do not use the retainer ring 82 and pin 92 arrangement are possible. For example, the housing 22 may simply act as a sleeve and telescopically slide over the housing base 26. Alternatively, internal threading may be included within the rear cylindrical portion 32 of the housing 22 and complimentary exterior threading may be included on the plug portion 62 of the housing base 26. However, the arrangement described previously is preferred because it prevents the housing 22 from possibly detaching or unscrewing from the plug portion 62 of the housing base 26 and falling onto the patient or workpiece.

Additionally, while the optical element 24 is generally contemplated to be a glass or plastic refractive lens, it need not necessarily be such a lens. The optical element 24 could instead be any other type of optical element with positive properties. Examples of such optical elements are binary optic means or a holographic optical element, which function on the basis of diffraction rather than refraction. Another possibility is a gradient index optical element wherein the index of refraction of the element varies linearly or radially about the optical axis to provide the desired optical characteristics.

Further, it is understood that in the claims, means plus function clauses are intended to cover the structures described herein as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. An illumination assembly comprising:
   a. a light guide having an output end and an input end, the input end being adapted for connection to a remote illumination source;
   b. a housing having a light guide opening and an illumination opening, the output end of the light guide extending within the housing and being aligned to illuminate the illumination opening;
   c. an aspheric lens mounted within the illumination opening; and
   d. attachment means for removably attaching the homing to headgear.

2. The illumination assembly of claim 1 wherein the light guide comprises a fiberoptic bundle.

3. The illumination assembly of claim 1 wherein the light guide has a diameter of less than 3 millimeters.

4. The illumination assembly of claim 1 wherein the housing includes a housing base telescopically engaged to the housing, wherein the output end of the light guide is attached to the housing base to provide an adjustable relationship between the output end and the aspheric lens.

5. The illumination assembly of claim 4 wherein the homing includes a helical groove therein, and a key riding within the helical groove.

6. The illumination assembly of claim 1 in combination with eyeglasses, wherein the attachment means is removably attached to the eyeglasses.

7. The illumination assembly of claim 1 in combination with binocular telescopes, wherein the attachment means is removably attached to the binocular telescopes.

8. The illumination assembly of claim 1 wherein the housing includes an attachment bevel for filter attachment surrounding the illumination opening.

9. The illumination assembly of claim 1 wherein the light guide opening and the illumination opening are both generally circular and are coaxial.

10. The illumination assembly of claim 1 wherein the attachment means comprises a clip pivotally mounted to the housing.

11. The illumination assembly of claim 1 wherein the aspheric lens has a diameter of less than 2 centimeters.

12. An illumination assembly comprising:
- a. a housing having a light guide opening and an opposing illumination opening;
- b. a housing base adjustably engaged to the housing, the housing base being adapted to support a light guide to illuminate the illumination opening;
- c. a positive lens mounted in the illumination opening, the positive lens including an aspheric face adjacent the housing base and an opposing generally planar face; and
- d. attachment means, pivotably attached to the housing base, for removably attaching the housing base to headgear.

13. The illumination assembly of claim 12 having a mass of less than 10 grams.

14. The illumination assembly of claim 12 having a maximum dimension of less than 2 inches.

15. The illumination assembly of claim 12 wherein the lens has a diameter of less than 2 centimeters.

16. The illumination assembly of claim 12 in combination with a light guide supported within the housing base.

17. The illumination assembly of claim 16 wherein the light guide is a fiberoptic bundle.

18. The illumination assembly of claim 12 wherein the housing is telescopically engaged to the housing base.

19. The illumination assembly of claim 18 including a key located between and rotatably engaging the housing and housing base.

20. The illumination assembly of claim 12 wherein the housing includes an attachment bevel surrounding the illumination opening, the attachment bevel being adapted for attachment of a filter.

* * * * *

UNITED STATES PATENT AND TRADEMARK OFFICE
CERTIFICATE OF CORRECTION

PATENT NO. : 5,667,291

DATED : September 16, 1997

INVENTOR(S) : Caplan et al.

It is certified that error appears in the above-identified patent and that said Letters Patent is hereby corrected as shown below:

Column 11, Line 58: Delete "an" and substitute -- art -- therefor.

Column 12, Line 51: Delete "homing" and substitute -- housing -- therefor.

Column 12, Line 63: Delete "homing" and substitute -- housing -- therefor.

Signed and Sealed this

Seventeenth Day of March, 1998

Attest:

Attesting Officer

BRUCE LEHMAN

Commissioner of Patents and Trademarks